(12) United States Patent
Ur Rehman et al.

(10) Patent No.: US 12,274,274 B2
(45) Date of Patent: Apr. 15, 2025

(54) PRODUCTION AND SEPARATION OF MILK FRACTIONS WITH A FINAL NANOFILTRATION STEP

(71) Applicant: fairlife, LLC, Chicago, IL (US)

(72) Inventors: Shakeel Ur Rehman, Chicago, IL (US); Timothy Peter Doelman, Chicago, IL (US); Kamil Piotr Drapala, Chicago, IL (US)

(73) Assignee: fairlife, LLC, Chicago, IL (US)

( * ) Notice: Subject to any disclaimer, the term of this patent is extended or adjusted under 35 U.S.C. 154(b) by 364 days.

(21) Appl. No.: 17/787,684

(22) PCT Filed: Dec. 15, 2020

(86) PCT No.: PCT/US2020/065136
§ 371 (c)(1),
(2) Date: Jun. 21, 2022

(87) PCT Pub. No.: WO2021/133594
PCT Pub. Date: Jul. 1, 2021

(65) Prior Publication Data
US 2023/0016527 A1    Jan. 19, 2023

Related U.S. Application Data

(60) Provisional application No. 62/952,526, filed on Dec. 23, 2019.

(51) Int. Cl.
*A23C 9/142* (2006.01)
*A23C 9/13* (2006.01)
*A23C 9/15* (2006.01)

(52) U.S. Cl.
CPC .......... *A23C 9/1422* (2013.01); *A23C 9/1307* (2013.01); *A23C 9/1427* (2013.01); *A23C 9/1512* (2013.01)

(58) Field of Classification Search
CPC ... A23C 9/1422; A23C 9/1307; A23C 9/1427; A23C 9/1512
(Continued)

(56) References Cited

U.S. PATENT DOCUMENTS 7,169,428 B2    1/2007 Dunker et al.
9,510,606 B2    12/2016 Ur-Rehman et al.
(Continued)

FOREIGN PATENT DOCUMENTS

CN    115175566 A    10/2022
EP    4081042 B1    1/2024
(Continued)

OTHER PUBLICATIONS

International Search Report and Written Opinion of the International Searching Authority for International Patent Application No. PCT/US2020/065136 mailed Apr. 13, 2021, 13 pages.
(Continued)

*Primary Examiner* — Brent T O'Hern
(74) *Attorney, Agent, or Firm* — Merchant & Gould P.C.

(57) ABSTRACT

Disclosed are methods for preparing dairy compositions using a final nanofiltration step. Generally, the methods also include an ultrafiltration step and a reverse osmosis step, and optionally, a diafiltration step.

24 Claims, 1 Drawing Sheet

(58) Field of Classification Search
USPC .......................................................... 426/580
See application file for complete search history.

(56) References Cited

U.S. PATENT DOCUMENTS

| | | | |
|---|---|---|---|
| 9,538,770 | B2 | 1/2017 | Ur-Rehman et al. |
| 9,775,366 | B2 | 10/2017 | Wolfschoon-Pombo et al. |
| 9,993,009 | B2 | 6/2018 | Tobin et al. |
| 10,080,372 | B2 | 9/2018 | Kallioinen et al. |
| 10,299,488 | B2 | 5/2019 | Döring et al. |
| 2011/0059220 | A1 | 3/2011 | Tossavainen et al. |
| 2013/0309353 | A1 | 11/2013 | Ur-Rehman et al. |
| 2018/0153184 | A1* | 6/2018 | Ur Rehman ............ A23C 9/152 |
| 2018/0249726 | A1 | 9/2018 | Döring et al. |
| 2019/0223461 | A1 | 7/2019 | Ur Rehman et al. |

FOREIGN PATENT DOCUMENTS

| | | |
|---|---|---|
| WO | 2018/200434 A1 | 11/2018 |
| WO | 2019/212704 A1 | 11/2019 |
| WO | WO2021/133594 | 7/2021 |

OTHER PUBLICATIONS

Meyer, P. et al., "Concentration of Milk and Whey by Membrane Technologies in Alternative Cascade Modes", Food Bioprocess Technol, 10: 674-686 (2017).

Dairy Processing Handbook, Chapter 6.4, pp. 123-125 and Chapter 15, p. 341 (extract), published by Tetra Pak Processing Systems AB, Lund Sweden, 1995.

Patricia Meyer, "Concentration of Dairy Fluids: An investigation on membrane cascades comprised of ultrafiltration in series with Nanofiltration or reverse osmosis for the energy-efficient concentration of skim milk and sweet whey", Technische Universitaet Muenchen, 2017; bibliography, contents, and pp. 5, 10, 11, 77, 78,116 and 117.

Notice of opposition against EP 4081042 B1, Arla Foods amba, Oct. 31, 2024, 26 pages.

Notice of opposition against EP 4081042 B1, Intercontinental Great Brands LLC, Oct. 31, 2024, 22 pages.

Shakhno et al., "Electrodialysis Application of the Ultrafiltration Permeate of Milk Before and After Reverse Osmosis," Chemical Engineering & Technology, Feb. 6, 2019, vol. 42, Issue 4, pp. 867-873.

\* cited by examiner

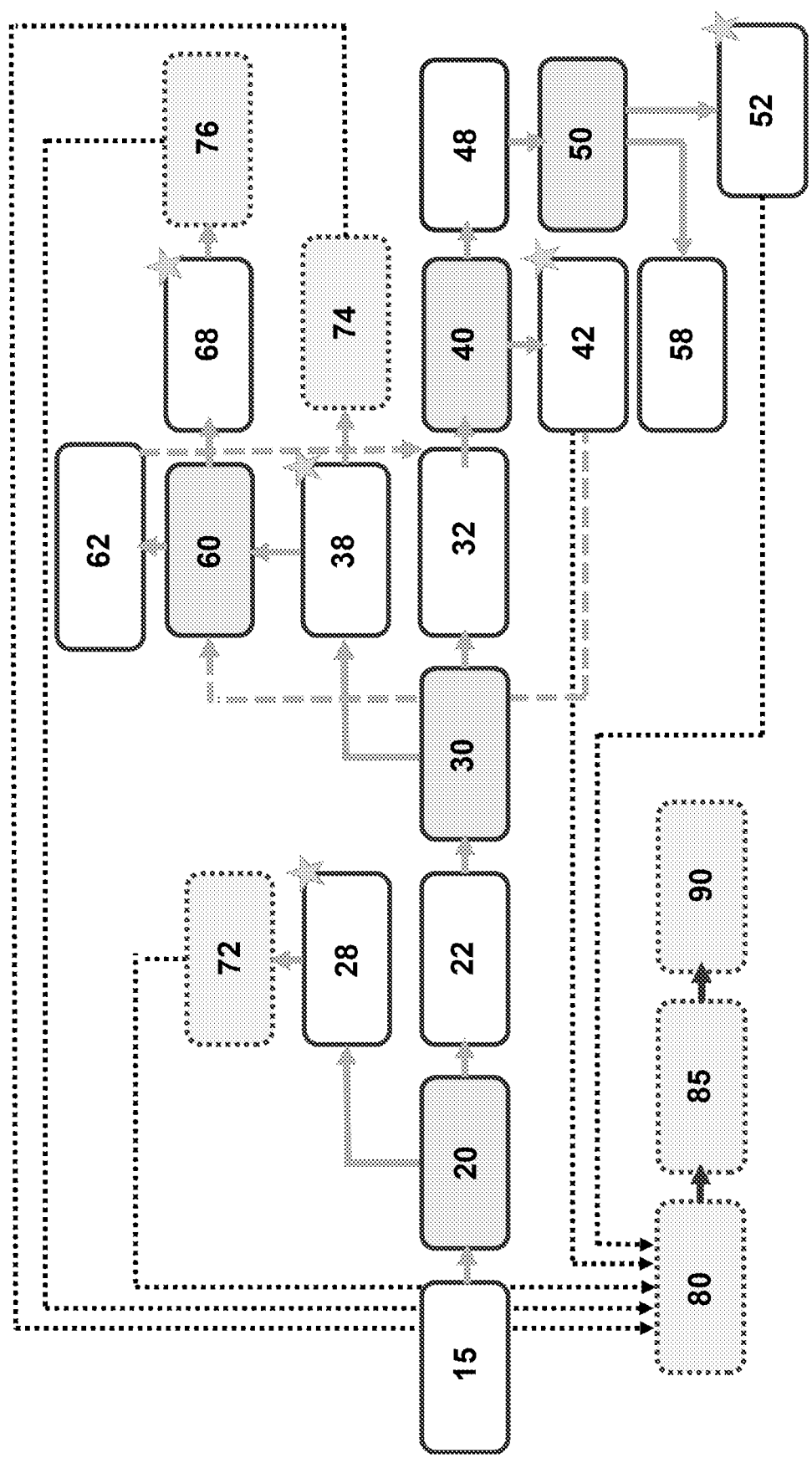

PRODUCTION AND SEPARATION OF MILK FRACTIONS WITH A FINAL NANOFILTRATION STEP

REFERENCE TO RELATED APPLICATIONS

This application is a National Stage Application of PCT/US2020/065136, filed on 15 Dec. 2020, which claims priority to U.S. Provisional Patent Application No. 62/952,526, filed on 23 Dec. 2019, the disclosures of which are incorporated herein by reference in their entirety. To the extent appropriate, a claim of priority is made to the above disclosed applications.

BACKGROUND OF THE INVENTION

The present invention relates generally to separating a milk product into protein, fat, carbohydrate, and mineral components using combinations of ultrafiltration, nanofiltration, diafiltration, and osmosis techniques. Also encompassed are dairy compositions produced by mixing the milk components in various combinations and proportions.

Membrane filtration processes are non-thermal fractionation and concentration technologies for fluids. When a fluid is passed through a semi-permeable membrane under pressure, the components that get retained on the surface of the membranes are called retentates or concentrates, while the materials that pass through the membrane are collectively called the permeate. Membrane technologies generally do not involve heat or chemicals for fractionation or concentration, and therefore do not adversely affect the properties of the fluid, which is beneficial for milk and its components. When fluids like milk are fractionated by these membrane technologies, typically proteins do not get denatured, enzymes do not get inactivated, vitamins are not destroyed, and reactions between proteins and sugars do not occur.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Consistent with embodiments of this invention, a method for making a dairy composition is disclosed, and this method can comprise (i) ultrafiltering a milk product (a skim milk product or a fat-containing milk product) at a temperature from about 3 to about 15° C. to produce a UF permeate fraction and a UF retentate fraction, (ii) subjecting the UF permeate fraction to a reverse osmosis step to produce a RO permeate fraction and a RO retentate fraction containing at least about 8 wt. % milk sugar (lactose or a derivative thereof), (iii) nanofiltering the RO retentate fraction to produce a NF permeate fraction containing from about 300 to about 800 ppm sodium and from about 1500 to about 3000 ppm potassium, and a NF retentate fraction containing at least about 10 wt. % milk sugar (lactose or a derivative thereof), and (iv) combining at least two of the UF retentate fraction, a DF/UF retentate fraction, the NF permeate fraction, the RO permeate fraction, the RO retentate fraction, and a fat-rich fraction to form the dairy composition. Optionally, this method can further comprise a step of diafiltering the UF retentate fraction to produce a DF/UF permeate fraction and the DF/UF retentate fraction. In some embodiments, the combining step can comprise combining at least the UF retentate fraction (or the DF/UF retentate fraction) and the NF permeate fraction, while in other embodiments, the combining step can comprise combining at least the fat-rich fraction, the UF retentate fraction (or the DF/UF retentate fraction), and the NF permeate fraction.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

BRIEF DESCRIPTION OF THE FIGURE

FIG. 1 presents a schematic flow diagram of a separations process consistent with an embodiment of this invention, which utilizes a final nanofiltration step.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Herein, features of the subject matter are described such that, within particular aspects and/or embodiments, a combination of different features can be envisioned. For each and every aspect, and/or embodiment, and/or feature disclosed herein, all combinations that do not detrimentally affect the designs, compositions, processes, and/or methods described herein are contemplated with or without explicit description of the particular combination. Additionally, unless explicitly recited otherwise, any aspect, and/or embodiment, and/or feature disclosed herein can be combined to describe inventive designs, compositions, processes, and/or methods consistent with the present invention.

In this disclosure, while compositions and methods are often described in terms of "comprising" various components or steps, the compositions and methods also can "consist essentially of" or "consist of" the various components or steps, unless stated otherwise. For example, a dairy composition consistent with embodiments of the present invention can comprise; alternatively, can consist essentially of; or alternatively, can consist of; a fat-rich fraction, a UF retentate fraction, and a NF permeate fraction.

The terms "a," "an," and "the" are intended to include plural alternatives, e.g., at least one, unless otherwise specified. For instance, the disclosure of "an ingredient" and "an additional milk fraction" are meant to encompass one, or mixtures or combinations of more than one, ingredient and additional milk fraction, unless otherwise specified.

In the disclosed methods, the term "combining" encompasses the contacting of components in any order, in any manner, and for any length of time, unless otherwise specified. For example, the components can be combined by blending or mixing.

The milk sugar-rich fraction (lactose-rich or a derivative thereof), milk sugar (lactose or a derivative thereof), and related terms are meant to encompass lactose and any derivatives thereof, e.g., hydrolyzed, un-hydrolyzed, epimerized, isomerized, or converted to oligosaccharides, as would be recognized by one of skill in the art. Moreover, these terms are also meant to encompass glucose/galactose, such as may be produced by the treatment of lactose with lactase enzyme.

Although any methods and materials similar or equivalent to those described herein can be used in the practice or testing of the invention, the typical methods and materials are herein described.

Various numerical ranges are disclosed herein. When a range of any type is disclosed or claimed herein, the intent is to disclose or claim individually each possible number that such a range could reasonably encompass, including end points of the range as well as any sub-ranges and combinations of sub-ranges encompassed therein, unless otherwise specified. As a representative example, the present application discloses that a UF retentate fraction can have, in certain embodiments, from about 9 to about 15 wt. % protein. By a disclosure that the protein content of the UF retentate fraction can be in a range from about 9 to about 15 wt. %, the intent is to recite that the protein content can be any amount within the range and, for example, can be equal to about 9, about 10, about 11, about 12, about 13, about 14, or about 15 wt. %. Additionally, the UF retentate fraction can contain an amount of protein within any range from about 9 to about 15 wt. % (for example, from about 10 to about 14 wt. %), and this also includes any combination of ranges between about 9 and about 15 wt. %. Further, in all instances, where "about" a particular value is disclosed, then that value itself is disclosed. Thus, the disclosure of a protein content from about 9 to about 15 wt. % also discloses a protein content from 9 to 15 wt. % (for example, from 10 to 14 wt. %), and this also includes any combination of ranges between 9 and 15 wt. %. Likewise, all other ranges disclosed herein should be interpreted in a manner similar to this example.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

DETAILED DESCRIPTION OF THE INVENTION

Methods for making dairy compositions are disclosed and described herein. Such methods can utilize a nanofiltration step as the final step in a milk fractionation process, after reverse osmosis.

While not wishing to be bound by theory, it is believed that a final nanofiltration step results in the recovery and use of more minerals, such as Ca, Mg, Na, and K, which might otherwise be lost. Thus, a significant benefit of the methods disclosed herein is the extraction of additional minerals from the starting milk product, and these minerals can be used in the production of a dairy composition, instead of being otherwise lost. In some instances, the amount of minerals in the NF permeate stream, unexpectedly, can range from about 0.35 to about 1 wt. %, or from about 0.4 to about 0.8 wt. %. Also, surprisingly high levels of sodium (~300-800 or ~400-700 ppm by weight) and potassium (~1500-3000 or 2000-2500 ppm by weight) beneficially can be recovered in the NF permeate stream.

Another benefit is a NF retentate stream that contains very high levels of milk sugar, such as lactose, with reduced levels of other milk components, such as a reduced protein content and/or a reduced mineral content. The concentrated lactose stream can be used in pharmaceutical applications and to produce lactose powder, as well as for conversion into lactic acid, lactobionic acid, or ethanol.

Further, by performing reverse osmosis before nanofiltration, a large milk water fraction (RO permeate) is formed, which is substantially free of protein, milk sugar (lactose or a derivative thereof), fat, and minerals. This large RO permeate stream, beneficially, can be used throughout the manufacturing facility, such as in diafiltration of the UF retentate or NF retentate. Additionally, the removal of the large amount of water enables faster and more efficient nanofiltration operation.

In accordance with an embodiment of this invention, a method for making a dairy composition can comprise (or consist essentially of, or consist of) (i) ultrafiltering a milk product at a temperature from about 3 to about 15° C. to produce a UF permeate fraction and a UF retentate fraction, (ii) subjecting the UF permeate fraction to a reverse osmosis step to produce a RO permeate fraction and a RO retentate fraction containing at least about 8 wt. % milk sugar (lactose or a derivative thereof), (iii) nanofiltering the RO retentate fraction to produce a NF permeate fraction containing from about 300 to about 800 ppm sodium and from about 1500 to about 3000 ppm potassium, and a NF retentate fraction containing at least about 10 wt. % milk sugar (lactose or a derivative thereof), and (iv) combining at least two of the UF retentate fraction, a DF/UF retentate fraction, the NF permeate fraction, the RO permeate fraction, the RO retentate fraction, and a fat-rich fraction to form the dairy composition. In some embodiments, the combining step can comprise combining at least the UF retentate fraction and the NF permeate fraction, while in other embodiments, the combining step can comprise combining at least the fat-rich fraction, the UF retentate fraction, and the NF permeate fraction. In these and other embodiments, the UF retentate fraction can be combined with RO permeate and subjected to diafiltration.

Generally, the features of this process (e.g., the characteristics of the milk product, the ultrafiltering step and the resultant UF permeate fraction and UF retentate fraction, the nanofiltering step and the resultant NF permeate fraction and NF retentate fraction, the diafiltering step and the resultant DF/UF permeate fraction and DF/UF retentate fraction, the reverse osmosis step and the resultant RO permeate fraction and RO retentate fraction, and the components that are combined to form the dairy composition, among others) are independently described herein and these features can be combined in any combination to further describe the disclosed methods. Moreover, other process steps can be conducted before, during, and/or after any of the steps listed in the disclosed methods, unless stated otherwise. Additionally, any dairy compositions (e.g., finished milk products, ready for consumption) produced in accordance with any of the disclosed methods are within the scope of this disclosure and are encompassed herein.

Filtration technologies (e.g., ultrafiltration, nanofiltration, diafiltration, etc.) can separate or concentrate components in mixtures—such as milk—by passing the mixture through a membrane system (or selective barrier) under suitable conditions (e.g., pressure). The concentration/separation can be, therefore, based on molecular size. The stream that is retained by the membrane is called the retentate (or concentrate). The stream that passes through the pores of the membrane is called the permeate. Referring now to the disclosed method for making a dairy composition, this method can comprise (i) ultrafiltering a milk product at a temperature from about 3 to about 15° C. to produce a UF permeate fraction and a UF retentate fraction, (ii) subjecting the UF permeate fraction to a reverse osmosis step to produce a RO permeate fraction and a RO retentate fraction containing at least about 8 wt. % milk sugar (lactose or a derivative thereof), (iii) nanofiltering the RO retentate fraction to produce a NF permeate fraction containing from about 300 to about 800 ppm sodium and from about 1500 to about 3000 ppm potassium, and a NF retentate fraction containing at least about 10 wt. % milk sugar (lactose or a derivative thereof), and (iv) combining at least two of the UF retentate fraction, a DF/UF retentate fraction, the NF permeate fraction, the RO permeate fraction, the RO retentate fraction, and a fat-rich fraction to form the dairy composition.

The milk product in step (i) can comprise (or consist essentially of, or consist of) skim milk, or alternatively, whole milk. In some embodiments, the disclosed methods can further comprise a step of separating (e.g., centrifugally separating or microfiltering) a raw milk or fresh milk (whole milk) into the milk product (also referred to as skim milk) and a fat-rich fraction (also referred to as cream or butter fat). The raw milk or fresh milk (whole milk) can be cow's milk, which contains approximately 87 wt. % water, 3-4 wt. % protein, 4-5 wt. % carbohydrates/lactose, 3-4 wt. % fat, and 0.3-0.8 wt. % minerals. When the fresh or raw milk product is separated into the skim milk product and the fat-rich fraction, the fat-rich fraction typically contains high levels of fat (e.g., 20-50 wt. % fat, or 30-50 wt. % fat) and solids (e.g., 30-60 wt. %, or 40-55 wt. %), and often contains approximately 1.5-4 wt. % protein, 2-5 wt. % lactose, and 0.2-0.9 wt. % minerals, although not limited thereto.

In step (i), ultrafiltering of the milk product can be conducted using ultrafiltration membranes with pore sizes that typically are in the 0.01 to 0.1 micron range. In the dairy industry, the ultrafiltration membranes often are identified based on molecular weight cut-off (MWCO), rather than pore size. The molecular weight cut-off for ultrafiltration membranes can vary from 1000-100,000 Daltons, or from 10,000-100,000 Daltons. For instance, the milk product can be ultrafiltered using a polymeric membrane system (ceramic membranes also can be employed). The polymeric membrane system (or ceramic membrane system) can be configured with pore sizes such that the materials having molecular weights greater than about 1,000 Daltons, greater than about 5,000 Daltons, or greater than about 10,000 Daltons, are retained, while lower molecular weight species pass through. For instance, UF membrane systems with a molecular weight cut-off of 10,000 Daltons can be used in the dairy industry for separating and concentrating milk proteins. In some embodiments, the step of ultrafiltering utilizes a membrane system having pore sizes in a range from about 0.01 to about 0.1 µm, and operating pressures typically in the 15-150 psig range, or the 45-150 psig range. While not being limited thereto, the ultrafiltration step often can be conducted at a temperature in a range from about 3 to about 15° C., such as from about 4 to about 12° C., or from about 5 to about 10° C. Ultrafiltering at lower temperatures results in superior product quality and organoleptic properties as compared to higher temperature ultrafiltration (e.g., ~25-50° C.), and further, a pasteurization step is not needed if low temperature ultrafiltration is utilized.

In step (ii), some or all of the UF permeate fraction can be subjected to a reverse osmosis step to produce a RO permeate fraction and a RO retentate fraction (the RO retentate fraction contains at least about 8 wt. % milk sugar (lactose or a derivative thereof)). Reverse osmosis is a fine filtration process or concentration process in which substantially all the remaining milk components are retained (RO retentate), and only water (RO permeate, milk water) passes through. Often, reverse osmosis membrane systems have a molecular weight cutoff of much less than 100 Da and, therefore, components other than water are concentrated in the reverse osmosis process (e.g., minerals). Generally, reverse osmosis comprises a membrane system having pore sizes of less than or equal to about 0.001 µm. Operating pressures typically are in the 450-1500 psig, or 450-600 psig, range. Temperatures ranging from about 5 to about 45° C., or from about 15 to about 45° C., often can used.

In step (iii), some or all of the RO retentate fraction can be subjected to a nanofiltration step to produce a NF permeate fraction (containing from about 300 to about 800 ppm sodium and from about 1500 to about 3000 ppm potassium) and a NF retentate fraction (containing at least about 10 wt. % milk sugar (lactose or a derivative thereof)). Nanofiltration in the dairy industry typically uses membrane elements that retain particles with molecular weights above approximately 100-300 Da. Nanofiltration is a pressure driven process in which the liquid is forced through a membrane under pressure, and materials having a molecular weight greater than the specified cut-off are retained, while smaller particles pass though the membrane pores. For generally separating lactose from minerals in an incoming stream, a pore size can be selected for maximum retention of lactose. Like ultrafiltration, nanofiltration can simultaneously perform both concentration and separation.

Nanofiltering of the RO retentate fraction can be conducted using nanofiltration membranes with pore sizes that typically are in the 0.001 to 0.01 micron range, for example, pore sizes in a range from about 0.001 to about 0.008 µm. In some embodiments, the step of nanofiltration utilizes a membrane system having pore sizes in a range from 0.001 to about 0.01 µm, with operating pressures typically in the 150-450 psig range, and operating temperatures ranging from about 10 to about 60° C. (or from about 15 to about 45° C.), although not limited thereto.

Optionally, the UF retentate fraction—some or all of the UF retentate fraction produced in step (i)—can be subjected to a diafiltration step to produce a DF/UF permeate fraction and a DF/UF retentate fraction. The DF/UF permeate fraction can be mixed with the UF permeate and then subjected to reverse osmosis, and the resulting RO retentate then can be subjected to nanofiltration to extract minerals and separate milk sugar (lactose or a derivative thereof). Generally, the diafiltration step is performed using ultrafiltration membranes, such as described above. However, other membranes can be used for the diafiltration step. In one embodiment, diafiltering the UF retentate fraction can comprise diafiltering a mixture of the UF retentate fraction and water. In another embodiment, diafiltering the UF retentate fraction can comprise diafiltering a mixture of the UF retentate fraction and the RO permeate fraction. In yet another embodiment, diafiltering the UF retentate fraction can comprise diafiltering a mixture of the UF retentate fraction, the RO permeate fraction, and water. These mixtures can utilize any suitable proportions or relative amounts of the UF retentate fraction and the RO permeate fraction and/or water. Often, the diafiltration of the UF retentate fraction results in the DF/UF permeate fraction (with milk sugar (e.g., lactose) and minerals extracted from the UF retentate) and the DF/UF retentate fraction (which is protein-rich).

When the UF retentate fraction is mixed with (diluted with) another component (e.g., water and/or the RO permeate fraction) prior to introduction into the ultrafiltration membrane system, the weight ratio of the other component to the UF retentate fraction often ranges from about 0.1:1 to about 1:1, from about 0.2:1 to about 0.8:1, or from about 0.3:1 to about 0.7:1, but is not limited thereto. The diafiltration—using ultrafiltration membranes—can be conducted at any suitable concentration factor, non-limiting examples of which include from about 1.2 to about 5, from about 1.3 to about 4, from about 1.2 to about 3, or from about 2 to about 3.

Step (iv) of the method of making a dairy composition comprises combining at least two of the UF retentate fraction, the DF/UF retentate fraction, the NF permeate fraction, the RO permeate fraction, the RO retentate fraction, and the fat-rich fraction to form the dairy composition. Any combinations of these components can be mixed or combined, in any suitable relative proportions, to form the dairy composition. In some embodiments, at least the UF retentate fraction and the NF permeate fraction can be combined, or at least the fat-rich fraction, the UF retentate fraction, and the NF permeate fraction can be combined; optionally, the RO permeate fraction and/or water also can be added in the combining step. In other embodiments, at least the DF/UF retentate fraction and the NF permeate fraction can be combined, or at least the fat-rich fraction, the DF/UF retentate fraction, and the NF permeate fraction can be combined; optionally, the RO permeate fraction and/or water also can be added in the combining step.

Moreover, an ingredient and/or an additional milk fraction also can be added in the combining step. Additionally or alternatively, an ingredient and/or an additional milk fraction can be added to the dairy composition after the combining step. Non-limiting examples of suitable ingredients can include a sugar/sweetener, a flavorant, a preservative (e.g., to prevent yeast or mold growth), a stabilizer, an emulsifier, a prebiotic substance, a probiotic bacteria, a vitamin, a mineral, an omega 3 fatty acid, a phyto-sterol, an antioxidant, or a colorant, and the like, as well as any mixture or combination thereof.

The additional milk fraction can be a "component-rich fraction," which is meant to encompass any fraction containing at least 15% more of a component of milk (protein, lactose/sugar, fat, minerals) than that found in cow's milk. For instance, a milk sugar-rich fraction often can contain from about 6 to about 20 wt. % sugar (i.e., in any form, such as lactose, glucose, galactose, etc.), from about 6 to about 18 wt. % sugar, or from about 7 to about 16 wt. % sugar. A mineral-rich fraction can contain from about 1 to about 20 wt. % minerals, from about 1 to about 10 wt. % minerals, or from about 1.5 to about 8 wt. % minerals. A fat-rich fraction often can contain from about 8 to about 50 wt. % fat, from about 20 to about 50 wt. % fat, or from about 30 to about 45 wt. % fat.

These component-rich milk fractions can be produced as described herein or by any technique known to those of skill in the art, such as by membrane filtration processes disclosed in U.S. Pat. Nos. 7,169,428, 9,510,606, and 9,538,770, which are incorporated herein by reference in their entirety. Additionally or alternatively, the component-rich milk fraction (or milk fractions) can be produced by a process comprising mixing water and a powder ingredient (e.g., protein powder, lactose powder, mineral powder, etc.).

Any suitable vessel and conditions can be used for any combining step disclosed herein, and such can be accomplished batchwise or continuously. As an example, the components can be combined in a suitable vessel (e.g., a tank, a silo, etc.) under atmospheric pressure, optionally with agitation or mixing, and optionally with an ingredient (or ingredients) and/or an additional milk fraction (or milk fractions), to form a batch of the finished dairy composition. As another example, the components can be combined continuously in a pipe or other suitable vessel under slight pressure (e.g., 5-50 psig), optionally mixed with ingredients and/or additional milk fractions, and the finished dairy composition can be transferred to a storage tank or filled into containers for retail distribution and sale. Representative systems that can be used for this continuous combining, mixing, and/or packaging can include tetra aldose systems and tetra flexidose systems. Other appropriate methods, systems, and apparatus for combining the components and other ingredients and/or milk fractions are readily apparent from this disclosure.

If desired, lactase enzyme can be added to the milk product prior to ultrafiltration, or lactase enzyme can be added to each component prior to the combining step, or lactase enzyme can be added to the resultant dairy composition. As described herein, the components can be combined in any suitable proportions, and optionally, any suitable ingredient and/or additional milk fraction can added in step (iv) to form the dairy composition. Additionally or alternatively, any suitable ingredient and/or additional milk fraction can be added to the dairy composition after the combining step.

Consistent with embodiments of this invention, the UF retentate fraction can be treated with lactase enzyme prior to the combining step, if desired. Likewise, if desired, the DF/UF retentate fraction can be treated with lactase enzyme prior to the combining step. Additionally or alternatively, lactase enzyme can be added during step (iv), or the dairy composition—after step (iv)—can be treated with lactase enzyme. In these circumstances, the lactose content can be reduced to less than about 1 wt. %, less than about 0.5 wt. %, less than about 0.2 wt. %, or less than about 0.1 wt. %.

Optionally, the method can further comprise a step of microfiltering the milk product (e.g., skim milk) prior to the ultrafiltering step, resulting in a MF permeate fraction and a MF retentate fraction. In such instances, step (i) can comprise ultrafiltering the MF permeate fraction to produce a UF permeate fraction and a UF retentate fraction. Microfiltering can be conducted using microfiltration membranes with relatively large pore sizes that typically are in the 0.1 to 10 micron range, for example, pore sizes in a range from about 0.2 to about 2 μm, or from about 0.1 to about 0.2 μm. In some embodiments, the step of microfiltering utilizes a membrane system having pore sizes in a range from about 0.1 to about 0.2 μm, with operating pressures typically less than about 75 psig (e.g., 10-15 psig) and operating temperatures ranging from about 5 to about 60° C. (or from about 35 to about 55° C.), although not limited thereto.

Often, microfiltration membranes can be used in the dairy industry to remove bacteria, bacterial spores, somatic cells, and other extraneous suspended materials from fluid milk, and therefore improve the quality and shelf-life of the resultant milk product. Microfiltration membranes can be used to separate fat from cheese or cheese whey and to separate milk fat from fluid milks, as an alternative to centrifugal separation.

The protein content of the UF retentate fraction and the DF/UF retentate fraction, independently, can be at least about 5 wt. %, at least about 6 wt. %, at least about 7 wt. %, at least about 8 wt. %, or at least about 9 wt. % protein. Illustrative and non-limiting ranges for the protein content of the UF retentate and the DF/UF retentate, independently, can include from about 5 to about 20 wt. % protein, from about 6 to about 18 wt. % protein, or from about 9 to about 15 wt. % protein.

Similarly, while not being limited thereto, the milk sugar (lactose or a derivative thereof) content of the UF permeate fraction, the UF retentate fraction, the DF/UF permeate fraction, and the DF/UF retentate fraction, independently, can be less than or equal to about 7 wt. %, or less than or equal to about 6 wt. %, but greater than or equal to about 3 wt. %, or greater than or equal to about 3.5 wt. %.

The milk sugar (lactose or a derivative thereof) content of the NF retentate fraction can be at least about 8 wt. %, at least about 10 wt. %, at least about 14 wt. %, at least about 17 wt. %, or at least about 20 wt. % milk sugar (lactose or a derivative thereof), but is not limited thereto. Illustrative and non-limiting ranges for the milk sugar content of the NF retentate fraction can include from about 10 to about 28 wt. %, from about 15 to about 28 wt. %, from about 15 to about 25 wt. %, from about 20 to about 28 wt. %, or from about 20 to about 25 wt. % milk sugar (e.g., lactose or a derivative thereof). The solids content of the NF retentate fraction generally is at least about 15 wt. %, at least about 20 wt. %, or at least about 22 wt. %, and often can range up to 25-30 wt. % The NF retentate fraction contains minimal amounts of protein, typically less than about 1 wt. %, less than about 0.7 wt. %, less than about 0.5 wt. %, or less than about 0.3 wt. % protein. The NF retentate fraction often contains from about 0.8 to about 2 wt. % of minerals, such as from about 1 to about 1.8 wt. % minerals.

The NF permeate fraction generally contains less than 1 wt. % solids, and only minimal amounts of milk sugar (e.g., lactose) and protein. Unexpectedly, the NF permeate contains a significant amount of minerals, which often ranges from about 0.35 to about 1 wt. %, such as from about 0.4 to about 0.8 wt. %. Also beneficially, high levels of sodium—from about 300 to about 800 ppm, or from about 400 to about 700 ppm—and potassium—from about 1500 to about 3000 ppm, or from about 2000 to about 2500 ppm—can be present in the NF permeate stream. These ppm amounts are ppm by weight.

The RO retentate fraction, after the reverse osmosis step, contains a significant amount of milk sugar (lactose or a derivative thereof), such as at least about 8 wt. % or at least about 10 wt. %, and often up to about 14-18 wt. %, and minerals in the 0.6-1.8 wt. % range, or in the 0.7-1.2 wt. % range. Generally, the RO permeate (milk water) fraction is substantially free of all of the milk components—fat, protein, milk sugar (e.g., lactose), and minerals. For instance, the milk water fraction can contain less than or equal to about 0.1 wt. % milk sugar (e.g., lactose), and less than or equal to about 0.1 wt. % minerals. Further, the milk water fraction can contain less than or equal to about 0.1 wt. % fat, and less than or equal to about 0.1 wt. % protein, and at least about 95 wt. % water, at least about 98 wt. % water, at least about 99 wt. % water, or at least about 99.5 wt. % water.

An illustrative and non-limiting example of a suitable separations process 10 consistent with embodiments of the method of this invention is shown in FIG. 1. First, fresh whole milk (raw milk) 15 is separated 20 into cream 28 and a skim milk product 22. The skim milk product 22 is then subjected to ultrafiltration 30, such as via a polymeric membrane system, as described herein, resulting in a UF retentate 38 often referred to as a protein-rich milk fraction, and a UF permeate 32, which contains milk sugar (lactose or a derivative thereof) and minerals. The UF permeate 32 is then subjected to reverse osmosis 40, resulting in a RO retentate 48 containing milk sugar (lactose or a derivative thereof) and minerals and a RO permeate 42 which consists essentially of water. The RO retentate 48 is then subjected to nanofiltration 50, resulting in a NF permeate 52 (which is mineral-rich) and a NF retentate 58 (which is milk sugar-rich). Optionally, some or all of the UF retentate 38 in FIG. 1 is mixed with RO permeate 42 and subjected to diafiltration 60, resulting in a DF/UF permeate fraction 62 and a DF/UF retentate fraction 68 (which is protein-rich).

The dairy composition 80 in FIG. 1 is formed by combining or mixing—in any suitable proportions—the UF retentate fraction 38, the DF/UF retentate fraction 68, the NF permeate fraction 52, the RO permeate fraction 42, and cream 28 (fat-rich fraction). As needed, the components can be treated with lactase enzyme 72, 74, 76 prior to mixing of the components, or after formation of the dairy composition 80. Subsequently, the dairy composition 80 is heat treated 85 and then cooled and packaged 90.

Consistent with embodiments of the improved methods for making a dairy composition disclosed herein, these methods can further comprise a step of treating the respective dairy composition with lactase enzyme, if desired. Accordingly, the lactose content can be reduced to less than about 1 wt. %, less than about 0.5 wt. %, less than about 0.2 wt. %, or less than about 0.1 wt. %.

Moreover, these methods also can further comprise a step of heat treating the dairy composition. In one embodiment, the step of heat treating can comprise pasteurizing at a temperature in a range from about 80° C. to about 95° C. for a time period in a range from about 2 to about 15 minutes. In another embodiment, the step of heat treating can comprise UHT sterilization at a temperature in a range from about 135° C. to about 145° C. for a time period in a range from about 1 to about 10 seconds. In yet another embodiment, the step of heat treating can comprise super UHT sterilization at a temperature in a range from about 148° C. to about 165° C. for a time period in a range from about 0.05 to about 1 second (e.g., 155° C. for approximately 0.1 seconds). Other appropriate pasteurization or sterilization temperature and time conditions are readily apparent from this disclosure. Further, this invention is not limited by the method or equipment used for performing the pasteurization/sterilization process—any suitable technique and apparatus can be employed, whether operated batchwise or continuously.

In some embodiments of this invention, the improved method for making a dairy composition, after a heat treatment step, can further comprise a step of packaging (aseptically or otherwise) the dairy composition in any suitable container and under any suitable conditions. Thus, after combining the various components, ingredients, and additional milk fractions as described herein to form the dairy composition, the dairy composition can be packaged under aseptic conditions (or non-aseptic conditions) in a container. Any suitable container can be used, such as might be used for the distribution and/or sale of dairy products in a retail outlet. Illustrative and non-limiting examples of typical containers include a cup, a bottle, a bag, or a pouch, and the like. The container can be made from any suitable material, such as glass, metal, plastics, and the like, as well as combinations thereof.

While not being limited thereto, the dairy composition can have a protein content of from about 1 to about 15 wt. %, or from about 3 to about 10 wt. %. Additionally or alternatively, the dairy composition can have a fat content of from about 0.05 to about 10 wt. %, or from about 0.1 to about 5 wt. %. Additionally or alternatively, the dairy composition can have a mineral content of from about 0.5 to about 2 wt. %. Additionally or alternatively, the dairy composition can have a lactose content of less than or equal to about 4 wt. %.

A representative and non-limiting example of a dairy composition consistent with this invention can contain less than or equal to about 0.5 wt. % fat, from about 2 to about 15 wt. % protein, from about 0.5 to about 2 wt. % minerals, and less than or equal to about 4 wt. % lactose. Another representative and non-limiting example of a dairy composition consistent with this invention can contain from about 0.5 to about 1.5 wt. % fat, from about 2 to about 15 wt. % protein, from about 0.5 to about 2 wt. % minerals, and less than or equal to about 4 wt. % lactose. Yet, another representative and non-limiting example of a dairy composition consistent with this invention can contain from about 1.5 to about 2.5 wt. % fat, from about 2 to about 15 wt. % protein, from about 0.5 to about 2 wt. % minerals, and less than or equal to about 4 wt. % lactose. Moreover, another representative and non-limiting example of a dairy composition consistent with this invention can contain from about 2.5 to about 5 wt. % fat, from about 2 to about 15 wt. % protein, from about 0.5 to about 2 wt. % minerals, and less than or equal to about 4 wt. % lactose.

Additional non-limiting examples of typical dairy compositions that can be produced by the methods disclosed herein include whole milk, low-fat milk, skim milk, buttermilk, flavored milk, low lactose milk, high protein milk, lactose-free milk, ultra-filtered milk, micro-filtered milk, concentrated milk, evaporated milk, high protein, high calcium, and reduced sugar milk, and the like.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Total solids (wt. %) were determined in accordance with procedure SMEDP 15.10 C by CEM Turbo Solids and Moisture Analyzer (CEM Corporation, Matthews, North Carolina). Ash is the residue remaining after ignition in a suitable apparatus at 550° C. to a constant weight; such treatment at 550° C. typically eliminates all organic matter, with the remaining material being primarily minerals (Standard Methods for the examination of dairy products, 17$^{th}$ edition (2004), American Public Health Association, Washington DC). The ash test was performed by using a Phoenix (CEM Microwave Furnace), which heated the samples at 550° C. for 30 min. The ash content (or mineral content) was determined in wt. %.

Specific Ca, Mg, Na, and K contents were determined using a Perkin Elmer Atomic Absorption Spectrophotometer. Samples were treated with trichloroacetic acid to precipitate proteins and the filtrate was analyzed by the Atomic Absorption Spectrophotometer. Protein content, fat content, and lactose content were determined by AOAC (Association of Official Analytical Chemists) methods.

In accordance with the process outlined in FIG. 1, in Example 1, raw milk (less than 5° C.) was separated by a centrifugal separator into a fat-rich fraction (cream) and fat-free fraction (fat-free milk or skim milk). The centrifugal separation process was performed at a temperature below 5° C. Skim milk at 5° C. was then fractionated into a protein-rich fraction (UF retentate) and a lactose-rich fraction (UF permeate) by passing the skim milk through UF membranes with a pore size where any molecule having molecular weight greater than 10,000 Daltons (Da) was retained in the UF retentate, which had an average protein content of 11.9 wt. % and fat content of 0.4 wt. %. The UF permeate had 5.62-5.77 wt. % total solids, 0.10-0.15 wt. % protein, 0.46-1.15 wt. % ash, and a pH range of 6.7-6.9. This UF permeate was concentrated in a RO unit (GEA Model R Pilot Unit, GEA Process Engineering Inc.) containing a RO spiral wound polymeric element (Koch Membranes 0.95-meter-long and 0.095 meter diameter). The temperature during RO processing varied from 6-19° C. under pressures of 400-500 psig. The RO concentrate (RO retentate) was then demineralized in an NF system (GEA Model R Pilot Unit, GEA Process Engineering Inc.) using NF membrane elements (NF-200, spiral wound membrane element, molecular weight cut-off 200 Da, diameter 3", length 0.95 meters; diameter 0.095 meter) at temperatures in the 12-26° C. range.

Table I summarizes the respective average compositions of the UF permeate fraction, the UF retentate fraction, the RO permeate fraction, the RO retentate fraction, the NF retentate fraction, and the NF permeate fraction during the 8-hour experiment of Example 1. In Table I, the mineral content (in wt. %) is generally similar to the ash content (wt. %), and thus the result of the ash test is used for quantification of the total mineral content in this disclosure. For each of the milk fractions, Table I summarizes the respective average Ca, Mg, Na, and K contents in ppm by weight.

Dairy compositions were made by mixing UF retentate, NF permeate, RO concentrate, RO permeate, and cream. A commercial lactase enzyme was added to the dairy composition to convert lactose into glucose and galactose for 16 hr at 4° C. prior to heat treatment. Table II summarizes the dairy compositions preparing using the milk fractions from Example 1 and from comparative milk fractions (prepared using UF, then NF, then RO). The objective was to obtain dairy compositions that were substantially the same, so slightly different blends were used for the comparative example and for Example 1. A six-member panel evaluated samples informally for their sensory properties using a triangle discrimination test (i.e., panelists were presented with one different and two alike samples and the panelists were instructed to taste the samples and identify the odd sample). The panel could not distinguish any differences between the compositions of Example 1 and the comparative compositions.

Table III summarizes Constructive Example 2, which is a simulated experiment using UF/RO/NF, and Table IV summarizes a simulated comparative experiment using conventional UF/NF/RO. These simulations were performed to provide a direct comparison of the UF/RO/NF and UF/NF/RO processes, and to demonstrate the benefits of the UF/RO/NF process of Example 2, in which reverse osmosis is performed prior to a final nanofiltration step. Unexpectedly, and beneficially, the UF/RO/NF process of Example 2 can recover more water (for use in other parts of the production facility, without having to purchase water), recover more minerals, and provide a more concentrated lactose stream than conventional UF/NF/RO processes.

TABLE 1

Summary of Example 1

|  |  | UF permeate | RO permeate | RO retentate |
|---|---|---|---|---|
| Total solids | wt. % | 5.68 | 0 | 13.1 |
| Protein | wt. % | 0.12 | 0 | 0.19 |
| Lactose | wt. % | 4.87 | 0 | 12.0 |
| Minerals | wt. % | 0.69 | 0 | 0.83 |
| Ca | ppm | 520 | 77 | 1078 |
| Mg | ppm | 83 | 3 | 333 |
| Na | ppm | 433 | 44 | 1254 |
| K | ppm | 1693 | 24 | 5060 |

TABLE 1-continued

Summary of Example 1

|  |  | NF permeate | NF retentate | UF retentate |
|---|---|---|---|---|
| Total solids | wt. % | 0.75 | 25.6 | 19.2 |
| Protein | wt. % | — | — | 11.9 |
| Lactose | wt. % | 0.2 | 24 | 5.6 |
| Minerals | wt. % | 0.51 | 1.4 | 1.3 |
| Ca | ppm | 72 | 735 | — |
| Mg | ppm | 7 | 163 | — |
| Na | ppm | 566 | 945 | — |
| K | ppm | 2194 | 3556 | — |

TABLE II

Summary of Dairy Compositions

| Dairy composition | Total solids (wt. %) | Protein (wt. %) | Fat (wt. %) | Minerals (wt. %) | Hydrolyzed Lactose (wt. %) |
|---|---|---|---|---|---|
| Comparative Example 1 | 11.02 | 5.53 | 1.92 | 0.77 | 2.80 |
|  | 10.88 | 5.54 | 1.94 | 0.71 | 2.69 |
| Comparative Example 1 | 10.94 | 5.65 | 1.90 | 0.54 | 2.85 |
|  | 10.82 | 5.65 | 1.92 | 0.55 | 2.70 |

TABLE III

Summary of Example 2 Process-UF, RO, and NF

| Ingredient | Concentration factor | Quantity (kg) | Minerals (kg) | Minerals (wt. %) | Lactose (kg) | Lactose (wt. %) |
|---|---|---|---|---|---|---|
| Skim milk (91 wt. % water) | 1 X | 100 | 0.72 | 0.72 | 4.8 | 4.8 |
| Ultrafiltration (UF) retentate | 3 X | 33 | 0.43 | 1.30 | 1.59 | 4.8 |
| Ultrafiltration (UF) permeate | 3 X | 67 | 0.29 | 0.43 | 3.21 | 4.8 |
| Reverse osmosis retentate of UF permeate (lactose/mineral concentrate) | 2 X | 33.5 | 0.29 | 0.86 | 3.21 | 9.6 |
| Reverse osmosis permeate of UF permeate (water) | 2 X | 33.5 | 0 | 0 | 0 | 0 |
| NF retentate of RO retentate | 2 X | 16.75 | 0.145 | 0.86 | 3.21 | 19.2 |
| NF permeate of RO retentate | 2 X | 16.75 | 0.145 | 0.86 | 0 | 0 |

Percent water recovered from 100 kg skim milk = 36.8 wt. % (33.5/0.91)
Percent minerals recovered in NF permeate = 20.1 wt. % (0.145/0.72)
Percent lactose in lactose concentrate = 19.2 wt. %

TABLE IV

Summary of Comparative Process-UF, NF, and RO

| Ingredient | Concentration factor | Quantity (kg) | Minerals (kg) | Minerals (%) | Lactose (kg) | Lactose (%) |
|---|---|---|---|---|---|---|
| Skim milk (91 wt. % water) | 1 X | 100 | 0.72 | 0.72 | 4.8 | 4.80 |
| Ultrafiltration (UF) retentate | 3 X | 33 | 0.43 | 1.30 | 1.59 | 4.80 |
| Ultrafiltration (UF) permeate | 3 X | 67 | 0.29 | 0.43 | 3.21 | 4.80 |
| Nanofiltration retentate of UF permeate (lactose concentrate) | 3 X | 22.33 | 0.178 | 0.79 | 3.21 | 14.4 |

TABLE IV-continued

Summary of Comparative Process-UF, NF, and RO

| Ingredient | Concentration factor | Quantity (kg) | Minerals (kg) | Minerals (%) | Lactose (kg) | Lactose (%) |
|---|---|---|---|---|---|---|
| Nanofiltration permeate of UF permeate | 3 X | 44.67 | 0.112 | 0.250 | 0 | 0 |
| RO retentate of NF permeate | 2 X | 22.33 | 0.112 | 0.50 | 0 | 0 |
| RO permeate of NF retentate (water) | 2 X | 22.33 | 0 | 0 | 0 | 0 |

Percent water recovered from 100 kg skim milk = 24.5% (22.33/0.91)
Percent minerals recovered in RO retentate = 15.5 wt. % (0.112/0.72)
Percent lactose in lactose concentrate = 14.4 wt. %

We claim:

1. A method for making a dairy composition, the method comprising:
   (i) ultrafiltering a milk product at a temperature from about 3 to about 15° C. to produce an ultrafiltration permeate fraction and an ultrafiltration retentate fraction;
   (ii) subjecting the ultrafiltration permeate fraction to a reverse osmosis step to produce a reverse osmosis permeate fraction and a reverse osmosis retentate fraction containing at least about 8 wt. % milk sugar;
   (iii) nanofiltering the reverse osmosis retentate fraction to produce
      a nanofiltration permeate fraction containing from about 300 to about 800 ppm sodium and from about 1500 to about 3000 ppm potassium, and
      a nanofiltration retentate fraction containing at least about 10 wt. % milk sugar; and
   (iv) combining at least two of the ultrafiltration retentate fraction, a diafiltration/ultrafiltration retentate fraction, the nanofiltration permeate fraction, the reverse osmosis permeate fraction, the reverse osmosis retentate fraction, and a fat-rich fraction to form the dairy composition.

2. The method of claim 1, wherein:
   the reverse osmosis retentate fraction contains from about 8 to about 18 wt. % milk sugar; and
   the nanofiltration retentate fraction contains from about 10 to about 28 wt. % milk sugar.

3. The method of claim 1, wherein a total solids content of the nanofiltration retentate fraction is from about 15 to about 30 wt. %.

4. The method of claim 1, wherein:
   a mineral content of the nanofiltration retentate fraction is from about 0.8 to about 2 wt. %; and
   a mineral content of the nanofiltration permeate fraction is from about 0.35 to about 1 wt. %.

5. The method of claim 1, wherein:
   the nanofiltration permeate fraction contains from about 2000 to about 2500 ppm potassium; and
   the nanofiltration permeate fraction contains from about 400 to about 700 ppm sodium.

6. The method of claim 1, wherein
   a protein content of the ultrafiltration retentate fraction is at least about 9 wt. %;
   a protein content of the diafiltration/ultrafiltration retentate fraction is at least about 9 wt. %;
   a milk sugar content of the ultrafiltration permeate fraction and/or the ultrafiltration retentate fraction is from about 3.5 to about 6 wt. %; and
   a milk sugar content of a diafiltration/ultrafiltration permeate fraction and/or the diafiltration/ultrafiltration retentate fraction is from about 3.5 to about 6 wt. %.

7. The method of claim 1, wherein the milk product is ultrafiltered at a temperature from about 4 to about 12° C.

8. The method of claim 1, wherein step (iv) comprises combining (a) the ultrafiltration retentate fraction and the nanofiltration permeate fraction, or (b) the fat-rich fraction, the ultrafiltration retentate fraction, and the nanofiltration permeate fraction.

9. The method of claim 1, further comprising a step of diafiltering the ultrafiltration retentate fraction to produce a diafiltration/ultrafiltration permeate fraction and the diafiltration/ultrafiltration retentate fraction.

10. The method of claim 9, wherein diafiltering the ultrafiltration retentate fraction comprises diafiltering a mixture of the ultrafiltration retentate fraction, the reverse osmosis permeate fraction, and optionally water.

11. The method of claim 9, wherein step (iv) comprises combining (a) the diafiltration/ultrafiltration retentate fraction and the nanofiltration permeate fraction, or (b) the fat-rich fraction, the diafiltration/ultrafiltration retentate fraction, and the nanofiltration permeate fraction.

12. The method of claim 1, wherein the method further comprises a step of separating a raw milk into the milk product and the fat-rich fraction.

13. The method of claim 1, wherein step (iv) further comprises adding water to form the dairy composition.

14. The method of claim 1, wherein the milk product comprises skim milk or whole milk.

15. The method of claim 1, wherein the ultrafiltration retentate fraction is treated with lactase enzyme prior to step (iv), or the diafiltration/ultrafiltration retentate fraction is treated with lactase enzyme prior to step (iv), or the method further comprises a step of treating the dairy composition with lactase enzyme, or any combination thereof.

16. The method of claim 1, wherein the dairy composition has:
   a fat content from about 0.05 to about 10 wt. %;
   a protein content from about 1 to about 15 wt. %;
   a mineral content from about 0.5 to about 2 wt. %; and
   a lactose content of less than or equal to about 4 wt. %.

17. The method of claim 1, wherein step (iv) further comprises adding an ingredient, wherein the ingredient comprises a sugar/sweetener, a flavorant, a preservative, a stabilizer, an emulsifier, a prebiotic substance, a probiotic bacteria, a vitamin, a mineral, an omega 3 fatty acid, a phyto-sterol, an antioxidant, a colorant, or any combination thereof.

18. The method of claim 1, wherein the method further comprises a step of heat treating the dairy composition.

19. The method of claim 1, wherein an amount of water recovered from the milk product is greater than that obtained by an otherwise identical process in which nanofiltering is performed prior to reverse osmosis.

20. The method of claim 1, wherein an amount of minerals in the nanofiltration permeate fraction is greater than that in a reverse osmosis retentate fraction obtained by an otherwise identical process in which nanofiltering is performed prior to reverse osmosis.

21. The method of claim 1, wherein a concentration of milk sugar in the nanofiltration retentate fraction is greater than that in a nanofiltration retentate fraction obtained by an otherwise identical process in which nanofiltering is performed prior to reverse osmosis.

22. A method for making a dairy composition, the method comprising:
  (i) ultrafiltering a milk product at a temperature from about 3 to about 15° C. to produce an ultrafiltration permeate fraction and an ultrafiltration retentate fraction;
  (ii) subjecting the ultrafiltration permeate fraction to a reverse osmosis step to produce a reverse osmosis permeate fraction and a reverse osmosis retentate fraction containing from about 8 to about 18 wt. % milk sugar;
  (iii) nanofiltering the reverse osmosis retentate fraction to produce
    a nanofiltration permeate fraction containing from about 300 to about 800 ppm sodium and from about 1500 to about 3000 ppm potassium, and
    a nanofiltration retentate fraction containing from about 10 to about 28 wt. % milk sugar; and
  (iv) combining (a) the ultrafiltration retentate fraction and the nanofiltration permeate fraction to form the dairy composition, or (b) combining a fat-rich fraction, the ultrafiltration retentate fraction, and the nanofiltration permeate fraction to form the dairy composition.

23. The method of claim 22, wherein step (iv) further comprises adding an ingredient, wherein the ingredient comprises a sugar/sweetener, a flavorant, a preservative, a stabilizer, an emulsifier, a prebiotic substance, a probiotic bacteria, a vitamin, a mineral, an omega 3 fatty acid, a phyto-sterol, an antioxidant, a colorant, or any combination thereof.

24. The method of claim 23, wherein step (iv) further comprises adding water to form the dairy composition.

* * * * *